United States Patent
Wight et al.

(10) Patent No.: US 11,173,497 B2
(45) Date of Patent: Nov. 16, 2021

(54) SEPARATOR FOR A FOOD-PRODUCT GRINDING MACHINE WITH RING ADJUSTMENT

(71) Applicant: Provisur Technologies, Inc., Chicago, IL (US)

(72) Inventors: E. William Wight, Roscoe, IL (US); Timothy Hahn, Clinton, WI (US); Kyle Schinkowsky, Whitewater, WI (US); Christopher Albrecht, Cambridge, WI (US); Nathan Levande, Darien, WI (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 724 days.

(21) Appl. No.: 15/689,300

(22) Filed: Aug. 29, 2017

(65) Prior Publication Data

US 2018/0071746 A1   Mar. 15, 2018

Related U.S. Application Data

(60) Provisional application No. 62/393,169, filed on Sep. 12, 2016.

(51) Int. Cl.
| | | |
|---|---|---|
| B02C 18/30 | (2006.01) | |
| B07B 1/20 | (2006.01) | |
| B07B 1/42 | (2006.01) | |

(52) U.S. Cl.
CPC .......... B02C 18/302 (2013.01); B02C 18/305 (2013.01); B07B 1/20 (2013.01); B07B 1/42 (2013.01)

(58) Field of Classification Search
CPC ..... B02C 18/30; B02C 18/301; B02C 18/302; B02C 18/304; B02C 18/305; B02C 18/38;
(Continued)

(56) References Cited

U.S. PATENT DOCUMENTS 3,273,495 A * 9/1966 Ozawa ..................... B30B 9/12
100/145
3,518,936 A 7/1970 Bredeson
(Continued)

FOREIGN PATENT DOCUMENTS

| DE | 3346063 A1 | 9/1984 |
|---|---|---|
| WO | 2016171336 A1 | 10/2016 |

OTHER PUBLICATIONS

International Search Report and Written Opinion from corresponding International Patent Application No. PCT/US2017/049076 dated Dec. 26, 2017, 11 pages.

(Continued)

*Primary Examiner* — Edward T Tolan
*Assistant Examiner* — Katie L. Parr
(74) *Attorney, Agent, or Firm* — Klintworth & Rozenblat IP LLP

(57) ABSTRACT

A grinding machine for grinding food-products, such as meat or the like, includes an orifice plate at the outlet of a grinding head. The orifice plate has collection passages that discharge a mixture of soft material and hard material through the orifice plate. A separator assembly, including a separator screw and separation chamber, is located downstream of the orifice plate for separating the soft material from the hard material. A ring adjustment assembly includes a ring valve having an internal conical portion in communication with a nose portion of the separator screw, and a ring valve carrier configured to reciprocally displace the ring valve in an axial direction relative to the separator screw so as to vary a gap between the nose portion of the separator screw and the internal conical portion of the ring valve. Adjustment of the gap distance determines an amount of the hard material that is passed toward the discharge outlet.

20 Claims, 15 Drawing Sheets

(58) Field of Classification Search
CPC ....... B02C 2018/308; B30B 9/12; B30B 9/14; B30B 9/18
USPC .................. 241/73, 82.1, 82.2, 82.5, 82.7
See application file for complete search history.

(56) References Cited

U.S. PATENT DOCUMENTS

| | | | |
|---|---|---|---|
| 3,574,891 A | 4/1971 | Bredeson | |
| 3,739,994 A | 6/1973 | McFarland | |
| 4,041,854 A | 8/1977 | Cox | |
| 4,042,176 A | 8/1977 | Robert et al. | |
| 4,069,980 A * | 1/1978 | Yarem | A22C 17/04 241/24.16 |
| 4,189,104 A | 2/1980 | Dos | |
| 4,340,184 A * | 7/1982 | Poss | A22C 17/04 241/82.3 |
| 4,638,954 A * | 1/1987 | Poss | A22C 17/04 209/262 |
| 4,824,027 A | 4/1989 | Jimmie et al. | |
| 4,928,892 A * | 5/1990 | Huebner | B02C 18/36 241/296 |
| 5,251,829 A | 10/1993 | Lesar | |
| 5,289,979 A | 3/1994 | Lesar | |
| 5,443,214 A | 8/1995 | Lesar | |
| 5,489,383 A | 2/1996 | Yoshikawa | |
| 5,906,154 A | 5/1999 | Yoon | |
| 6,145,766 A | 11/2000 | Mraz | |
| 6,394,377 B1 | 5/2002 | Kim | |
| 6,622,950 B1 * | 9/2003 | Fleming | A22C 17/04 241/74 |
| 7,461,800 B2 * | 12/2008 | Lesar | B02C 18/302 241/30 |
| 7,744,025 B2 | 6/2010 | Albrecht | |
| 7,766,264 B2 | 8/2010 | Lesar et al. | |
| 7,922,567 B2 * | 4/2011 | Gulak | A22C 17/04 452/138 |
| 10,039,404 B2 | 8/2018 | Kim | |
| 10,888,872 B2 | 1/2021 | Rochedreux | |
| 10,933,426 B2 | 3/2021 | Leonardi | |
| 2003/0154867 A1 | 8/2003 | Kim | |
| 2004/0173700 A1 | 9/2004 | Guy | |
| 2012/0178350 A1 * | 7/2012 | McFarland | A22C 17/04 452/138 |
| 2014/0008560 A1 | 1/2014 | York | |
| 2014/0034764 A1 | 2/2014 | Lesar | |
| 2015/0108259 A1 | 4/2015 | Metcalf | |
| 2015/0108261 A1 * | 4/2015 | Metcalf | B02C 18/30 241/79 |
| 2016/0030943 A1 * | 2/2016 | York | B02C 18/301 241/30 |
| 2016/0096180 A1 | 4/2016 | Lesar et al. | |
| 2017/0080661 A1 | 3/2017 | Lin | |

OTHER PUBLICATIONS

International Search Report and Written Opinion from corresponding International Patent Application No. PCT/US2017/049319 dated Nov. 13, 2017, 12 pages.

* cited by examiner

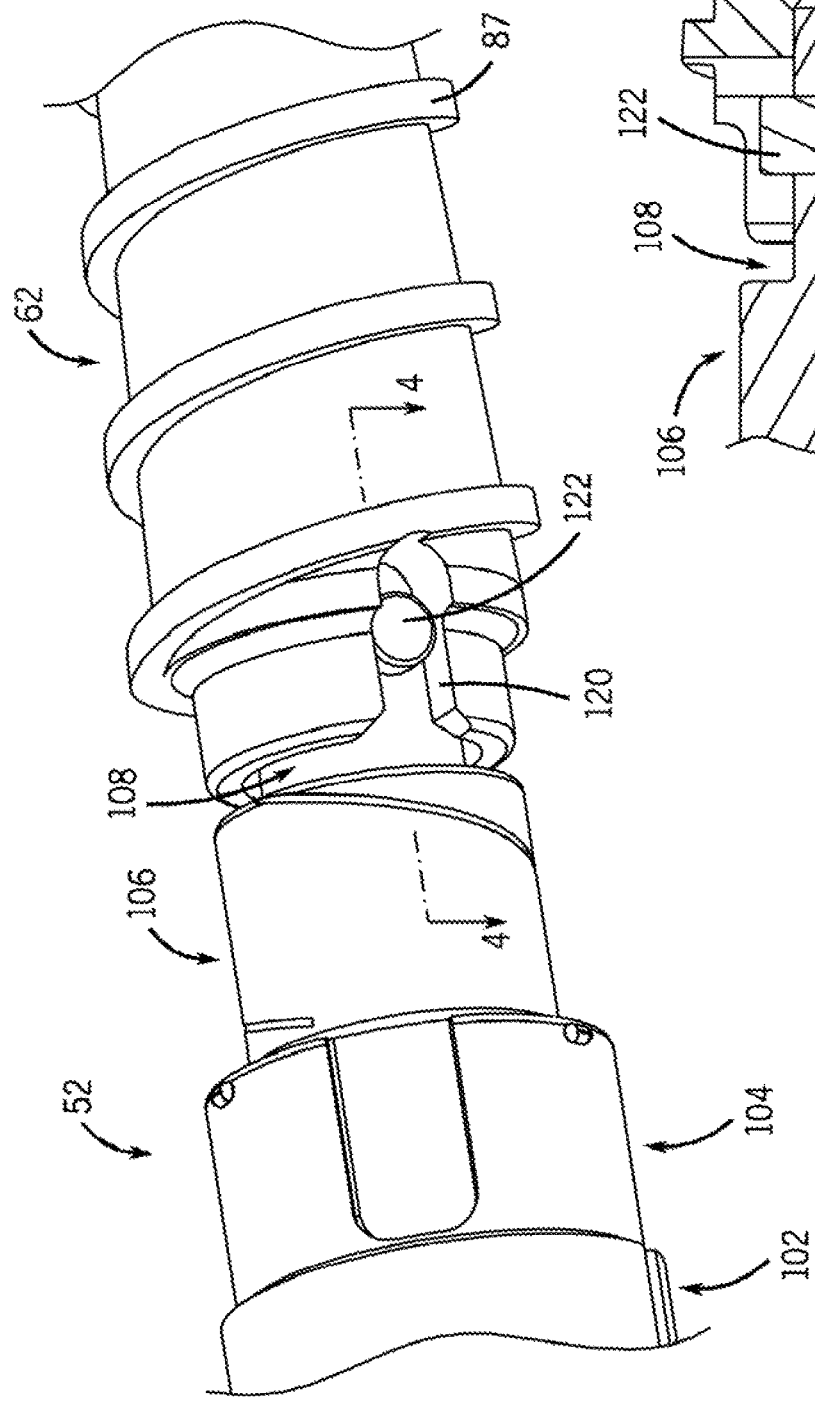
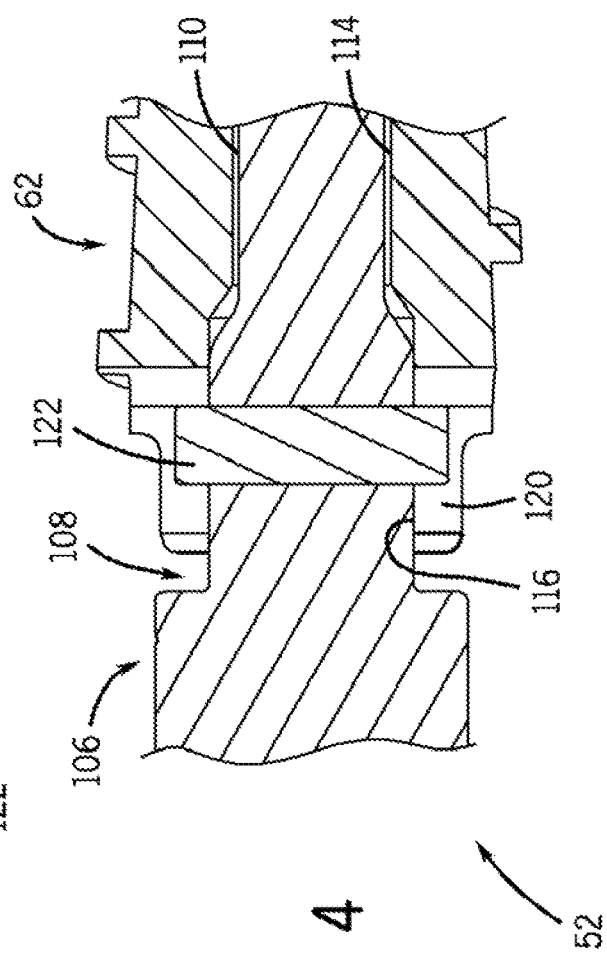

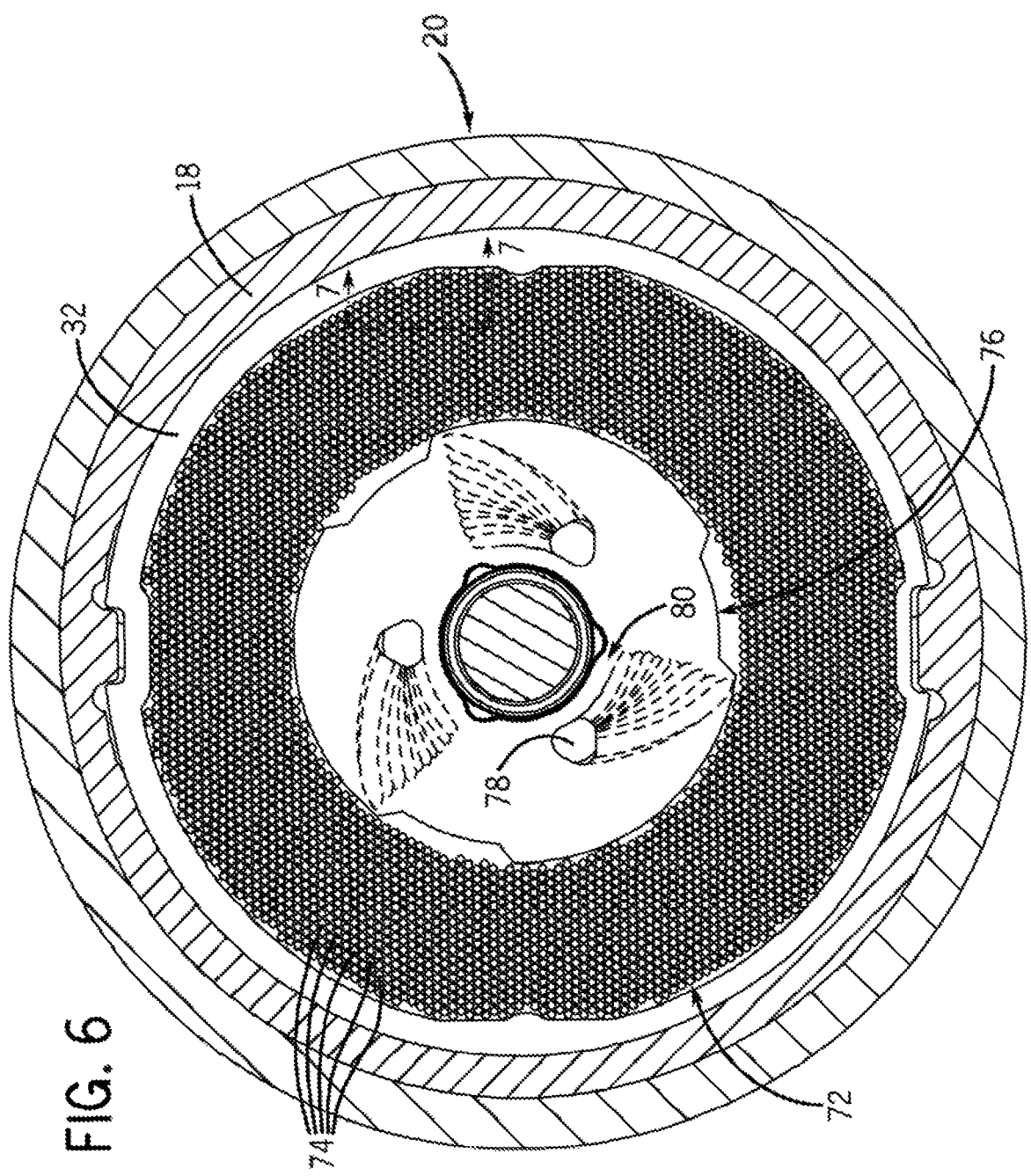

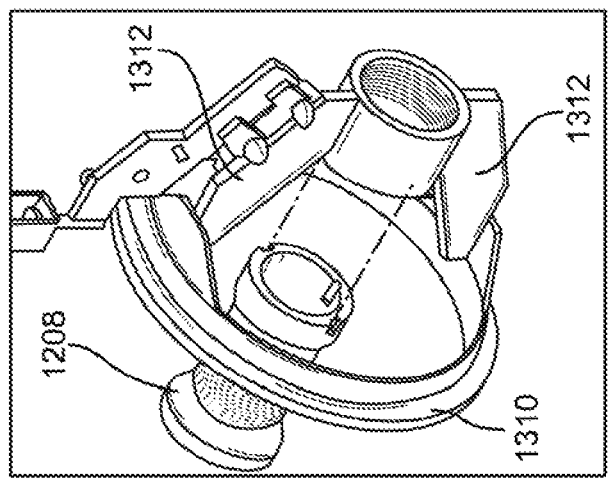

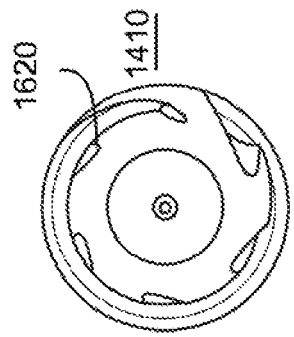
FIG.16C
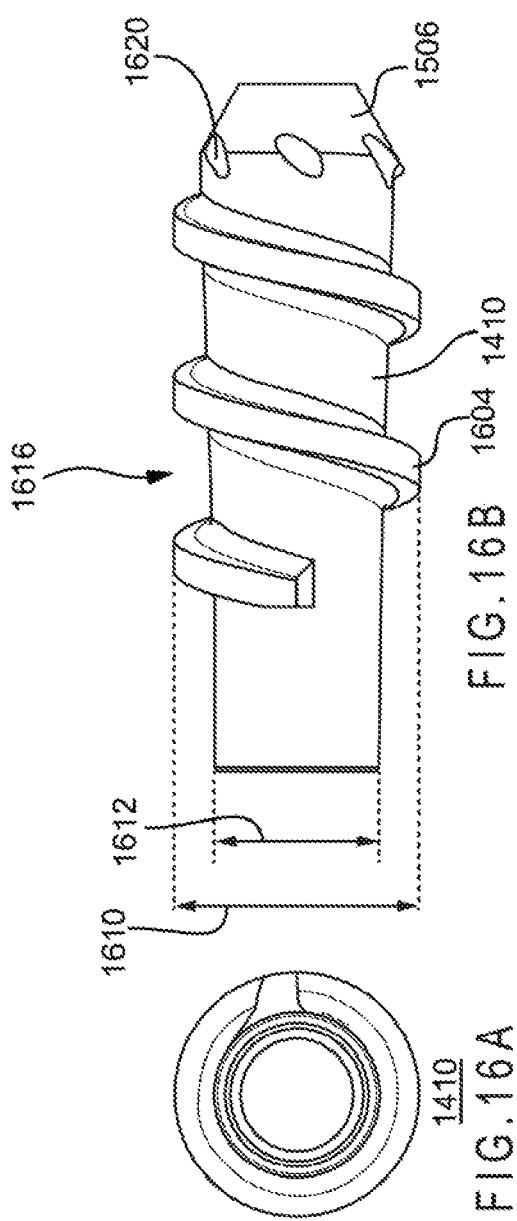
FIG.16B
FIG.16A
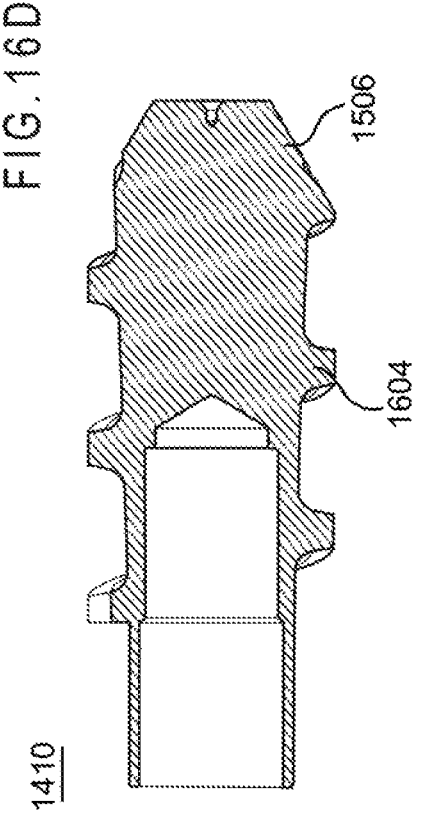
FIG.16D
FIG.16E

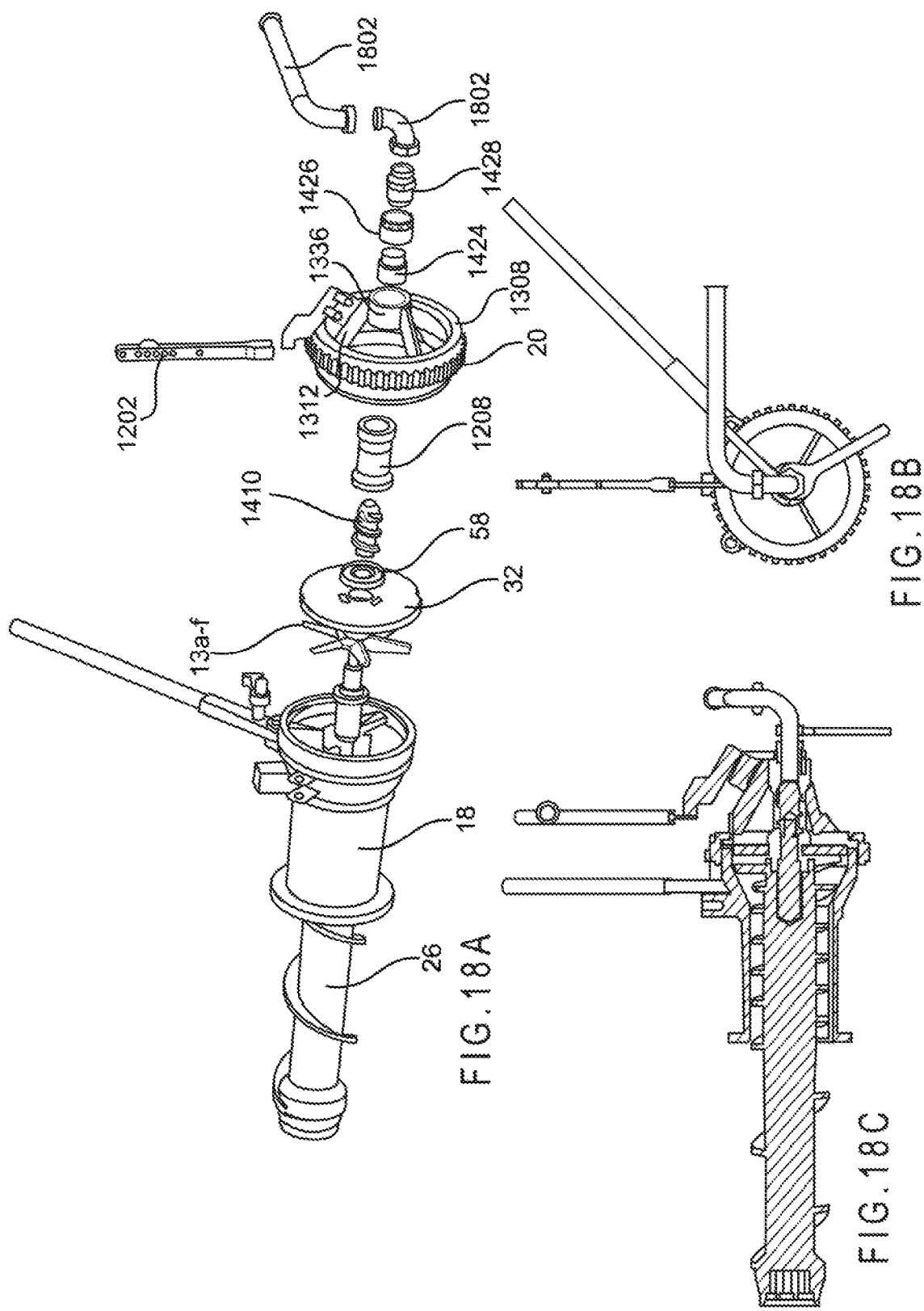

SEPARATOR FOR A FOOD-PRODUCT GRINDING MACHINE WITH RING ADJUSTMENT

CROSS-REFERENCE TO RELATED APPLICATIONS

This application claims priority to U.S. provisional application Ser. No. 62/393,169, filed on Sep. 12, 2016, the contents of which is incorporated herein in its entirety.

BACKGROUND OF THE INVENTION

This disclosure relates to a grinding machine for foodstuffs such as meat, and more particularly to a recovery system for an orifice plate-type grinding machine that includes a hard material collection arrangement with a ring-based adjustment mechanism.

A typical grinding machine includes a hopper that receives material to be ground and an advancement mechanism such as a rotatable auger that conveys the material away from the hopper toward a grinding head. The grinding head typically includes a discharge opening or outlet within which an orifice plate is positioned. A knife assembly is located between the end of the auger and the orifice plate, and is typically engaged with the auger and rotatable in response to rotation of the auger. The knives of the knife assembly cooperate to shear the material as it is forced through the orifices of the orifice plate.

Systems have been developed for the purpose of preventing hard material from passing through the orifices of the orifice plate. In a meat grinding application, for example, such systems function to route hard material such as bone, gristle and sinew away from the grinding orifices of the orifice plate. Representative hard material collection systems are shown and described in U.S. Pat. No. 7,461,800 issued Dec. 9, 2008; U.S. Pat. No. 5,344,086 issued Sep. 6, 1994; U.S. Pat. No. 5,289,979 issued Mar. 1, 1994; and U.S. Pat. No. 5,251,829 issued Oct. 12, 1993, the entire disclosures of which are hereby incorporated by reference. Typically, hard material collection systems of this type route the hard material to collection passages located toward the center of the orifice plate, where the hard material is supplied to a discharge tube or the like.

The hard material that is discharged through the collection passages is typically contained within a mixture that includes both hard material and soft, usable material. Various arrangements have been developed to recover the soft, usable material within the mixture, some of which are shown and described in the above-noted patents.

SUMMARY OF THE INVENTION

Some embodiments of the present invention provide an improved system for recovering the soft, usable material in the mixture of hard and soft material that is discharged from hard material collection passages in an orifice plate-type grinding machine. Other embodiments of the invention provide such a system that requires little or no adaptation of the grinding components of the grinding machine. In other embodiments of the invention, such a system is capable of adjustment for accommodating different types of material.

In accordance with embodiments of present invention, a recovery arrangement for a grinding machine is in the form of a separator assembly located downstream of the orifice plate of the grinding machine. The separator assembly includes an upstream inlet that receives the mixture of soft material and hard material from the collection passages of the orifice plate, in combination with a separator chamber having a wall that defines an axially extending tapered separator passage. The separator passage receives the mixture of soft material and hard material from the upstream inlet. The wall of the separator chamber includes a series of perforations that communicate between the separator passage and an outer surface defined by the wall. The separator assembly further includes a separator screw disposed within the separator passage of the separator chamber. The separator screw is interconnected with the rotatable advancement member and is rotatable within the separator passage in response to rotation of the rotatable advancement member. Rotation of the separator screw causes separation of soft material from the mixture of soft material and hard material, and forces the soft material through the perforations in the wall of the separator chamber. The separator chamber defines a downstream end that includes an outlet for discharging hard material.

The separator assembly may include an open support extending outwardly from the grinding head, and the separator chamber is engaged with and supported by the support at a location downstream of the orifice plate. In one embodiment, a centering pin extends from the rotatable advancement member. The centering pin rotates with the rotatable advancement member and is engaged within a center opening defined by the orifice plate, and the separator screw may be engaged with the centering pin so as to be rotatable with the rotatable advancement member via engagement with the centering pin. Engagement structure is interposed between the centering pin and the separator screw for non-rotatably securing the separator screw to the centering pin. An adjustment arrangement is operable to adjust the axial position of the separator screw within the separator passage, and the engagement structure between the separator screw and the centering pin is configured to accommodate axial movement of the separator screw relative to the centering pin by operation of the adjustment arrangement. Representatively, the engagement structure may be in the form of a bore in the separator screw within which the centering pin is received, a transverse passage in the centering pin, a slot in the separator screw that overlaps the transverse passage, and a transverse engagement pin that extends through the slot and the transverse passage. With this arrangement, the slot accommodates axial movement of the separator screw relative to the centering pin.

In one embodiment, the support and the orifice plate are configured and arranged to prevent axial movement of the separator chamber. The adjustment arrangement may be carried by the support and interconnected with the separator screw for providing axial movement of the separator screw within the separator passage. The adjustment arrangement may be in the form of an axially extending threaded adjustment member that extends through the support and into engagement with a threaded passage extending inwardly from a downstream end defined by the separator screw.

In another embodiment the grinding machine includes a grinding head defining an opening and a rotatable food-product advancement member contained within the grinding head. An orifice plate is located within the opening of the grinding head, where the orifice plate defines an upstream surface and a downstream surface, and includes a plurality of outer grinding openings extending between the upstream surface and the downstream surface for discharging soft material through the orifice plate upon rotation of the rotatable food-product advancement member. One or more collection passages extend between the upstream surface and the downstream surface for discharging a mixture of soft material and hard material through the orifice plate upon rotation of the rotatable food-product advancement member. A separator assembly is located downstream of the orifice plate, wherein the separator assembly includes an upstream inlet that receives the mixture of soft material and hard material from the collection passages, a cylindrical separator chamber having a sidewall that defines a constant diameter separator passage, wherein the separator passage receives the mixture of soft material and hard material from the upstream inlet, and where the sidewall of the separator chamber includes a plurality of apertures, and a separator screw disposed within the separator passage of the separator chamber, and where the separator screw has a constant major diameter and may have a constant or variable minor diameter along a body portion thereof. In some embodiments, the minor diameter may be constant, while in other embodiments, the minor diameter may be fixed or constant. The separator screw is interconnected with the rotatable food-product advancement member and is rotatable within the separator passage in response to rotation of the rotatable food-product advancement member, where rotation of the separator screw causes separation of soft material from the mixture of soft material and hard material, and forces the soft material through the apertures in the sidewall of the separator chamber, and advances the hard material in the downstream direction toward a discharge outlet.

Also included is a ring adjustment assembly including a ring valve having an internal conical portion in communication with a nose portion of the separator screw, where the ring valve is in axial alignment with the separator screw. A ring valve carrier is configured to reciprocally displace the ring valve in an axial direction relative to the separator screw so as to vary a gap between the nose portion of the separator screw and an internal conical portion of the ring valve, wherein the size of the gap determines an amount, and in some embodiments, a size of the hard material that is passed toward the discharge outlet.

In another embodiment, a ring adjustment assembly for a grinding machine includes a grinding head in communication with a cylindrical separator chamber, where the cylindrical separator chamber has a sidewall that defines a constant diameter separator passage, and where the sidewall includes a plurality of apertures. The separator chamber has an inlet end and an outlet end, and the inlet end is configured to receive a mixture of soft material and hard material from an upstream portion of the grinding head. A separator screw disposed within the separator passage of the separator chamber, and has a body portion and a nose portion. Also includes is a ring valve having an internal conical portion in communication with the nose portion of the separator screw, where the ring valve is in axial alignment with the separator screw. A ring valve carrier is configured to reciprocally displace the ring valve in an axial direction relative to the separator screw so as to vary a gap between the nose portion of the separator screw and the internal conical portion of the ring valve. The size of the gap determines an amount of the hard material that is passed toward a discharge outlet of the ring adjustment assembly.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 3 is an enlarged partial isometric view showing a portion of the separator-type recovery system of FIG. 1 and engagement of the separator screw with the centering pin of the grinding machine;

FIG. 4 is a partial section view taken along line 4-4 of the FIG. 3;

FIG. 6 is a section view taken along line 6-6 of FIG. 5;

FIG. 7 is a partial section view taken along line 7-7 of FIG. 6;

FIGS. 13A and 13B are perspective views of support bridge and separator chamber for the grinding arrangement of FIG. 12;

FIGS. 16A-16H show various views of the separation screw for the grinding arrangement of FIG. 12;

FIG. 18A is an exploded assembly view of all components of the grinder of FIG. 12; and FIGS. 18B and 18C are side and end views, respectively, of the grinder of FIG. 18A.

DETAILED DESCRIPTION

The various features and advantageous details of the subject matter disclosed herein are explained more fully with reference to the non-limiting embodiments described in detail in the following description.

Figure 1:
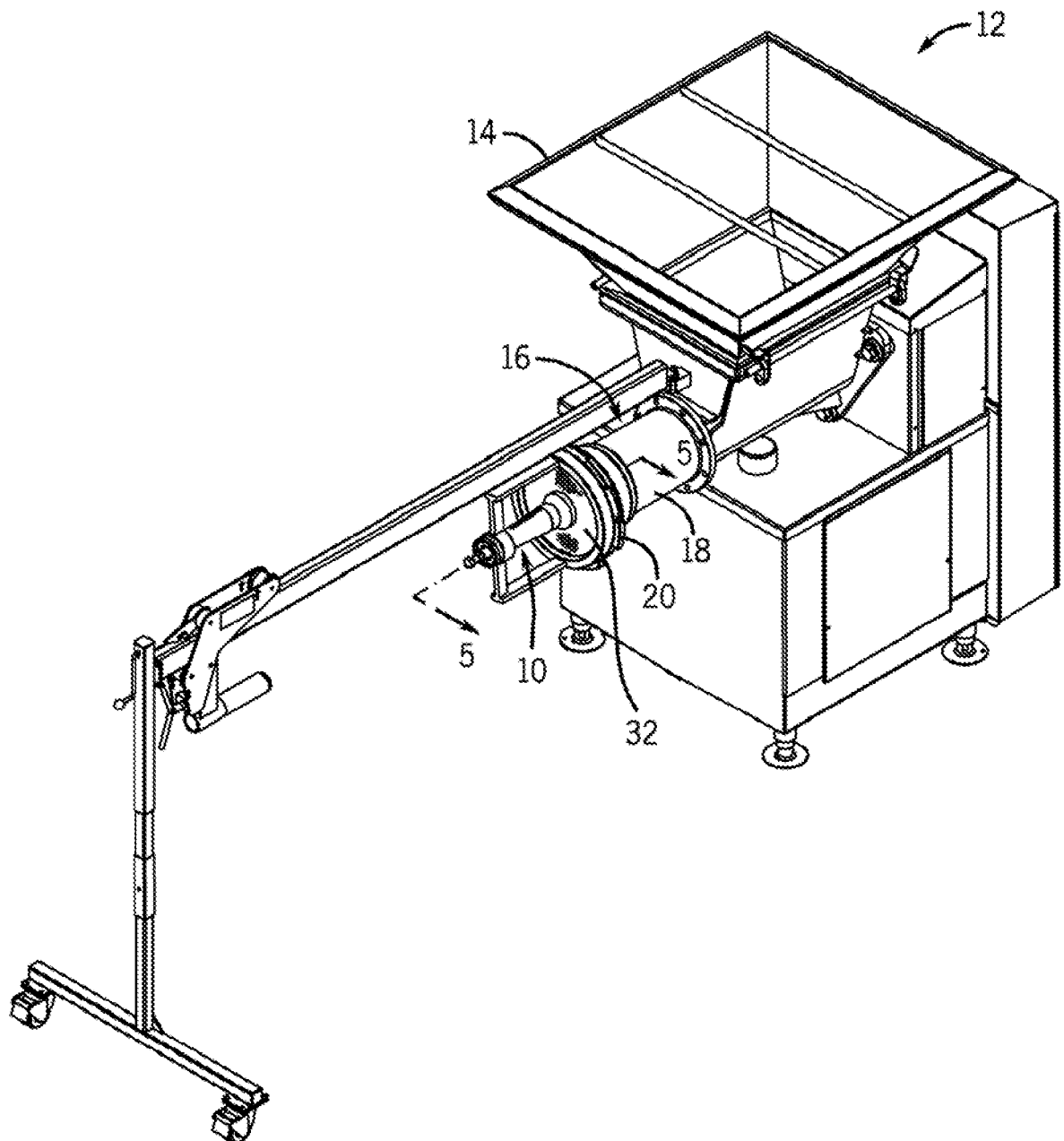
FIG. 1 is an isometric view of a grinding machine incorporating the separator-type recovery system of the present invention.
Figure 2:
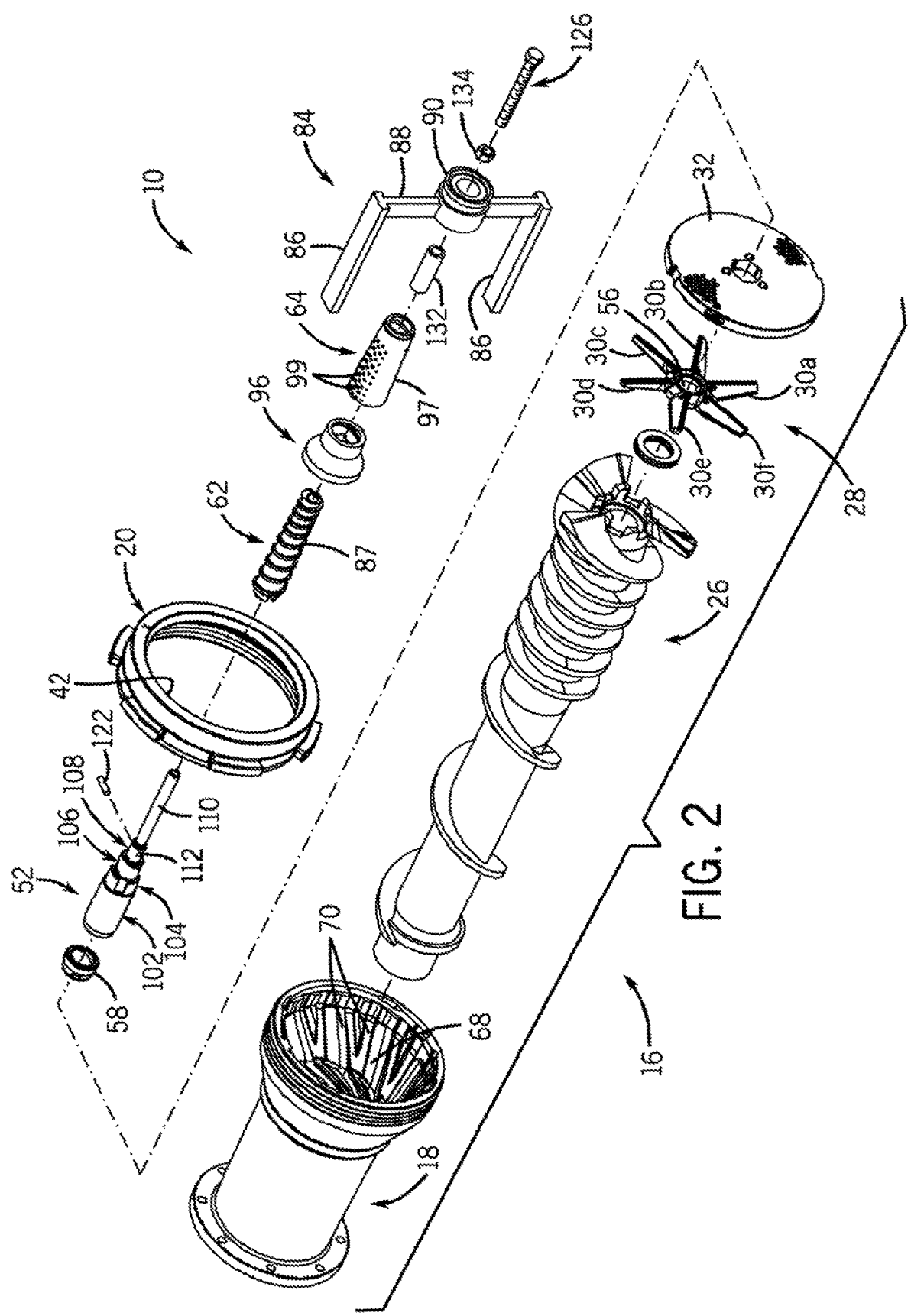
FIG. 2 is an exploded isometric view showing the components of the separator-type recovery system of FIG. 1.
Figure 5:
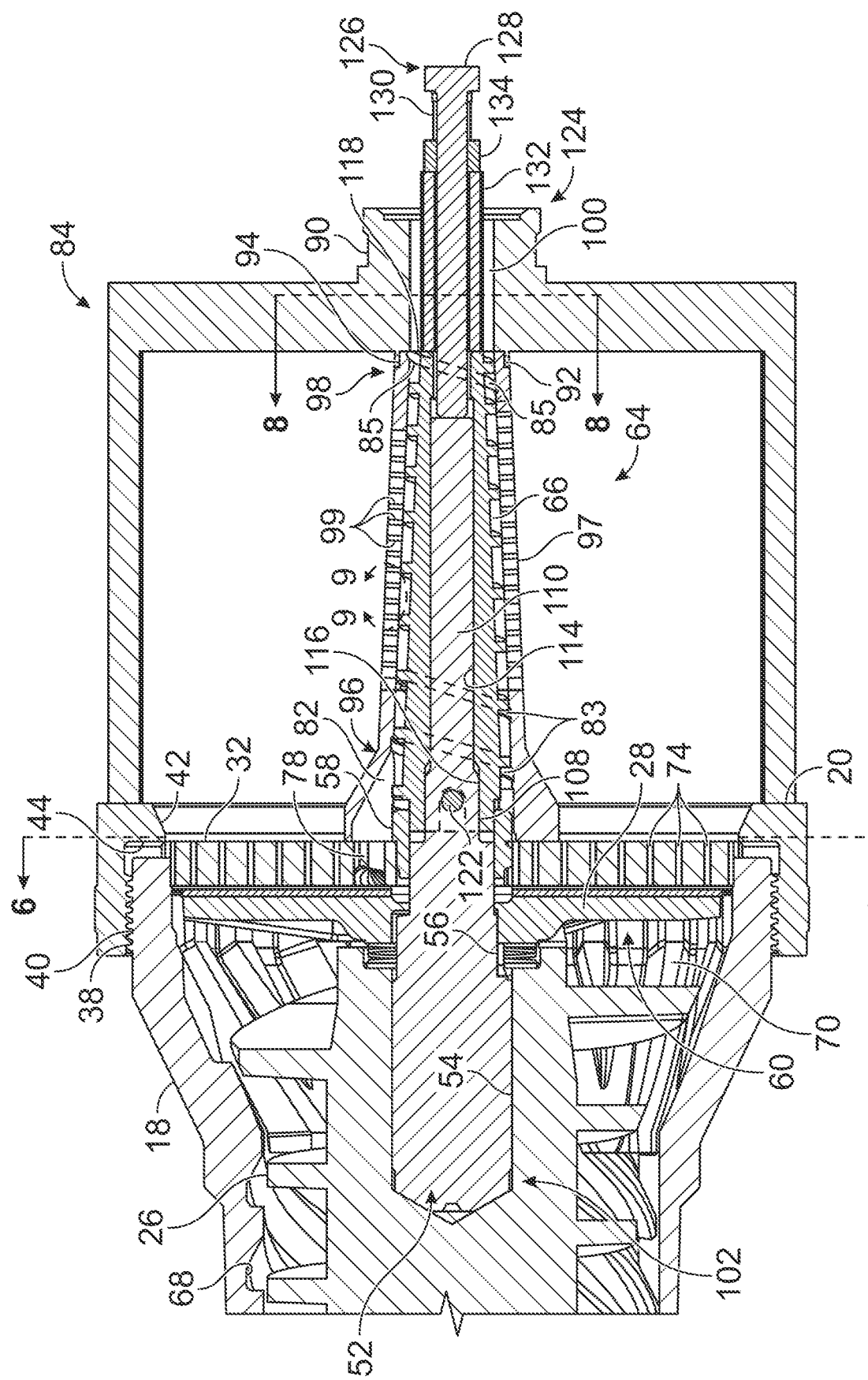
FIG. 5 is a partial section view taken along line 5-5 of FIG. 1.

The present invention is directed to a separator assembly 10 that can be coupled to a discharge or outlet end of a grinding machine, such as grinding machine 12. As generally known in the art, grinding machine 12 has a hopper 14 and a grinding arrangement shown generally at 16. In a manner as is known, grinding arrangement 16 includes a housing or head 18 which includes a mounting ring 20 that secures and orifice plate 32 within an opening or discharge outlet in the downstream end of grinding head 18. With reference to FIGS. 2 and 5, grinding machine 12 further includes a rotatable advancement member which may be in the form of a teed auger or screw 26 that is rotatably mounted within head 18 so that, upon rotation of feed screw 26 within head 18, material is advanced from hopper 14 through the interior of head 18. A knife holder 28 is mounted at the end of, and rotates with, feed screw 26. Knife holder 28 has a number of arms 30*a*-30*f* and a corresponding number of knife inserts, one corresponding to each of arms 30*a-f*, and it is understood that any number of arms and corresponding inserts may be employed.

The knife holder 28 is located adjacent an inner grinding surface of orifice plate 32, which is secured in the open end of head 18 by mounting ring 20. The knife inserts bear against the inner grinding surface of orifice plate 32. In accordance with known construction, the end of head 18 is provided with a series of external threads 38, and mounting ring 20 includes a series of internal threads 40 adapted to engage the external threads 38 of head 18. Mounting ring 20 further includes an opening 42 defining an inner lip 44. While a threaded connection between mounting ring 34 and head 18 is shown, it is understood that mounting ring 34 and head 18 may be secured together in any other satisfactory manner.

A center pin 52 has its inner end located within a central bore 54 formed in the end of feed screw 26, and the outer end of center pin 52 extends through a central passage 56 formed in a central hub area of knife holder 28 and through the center of a bushing 58. In a manner to be explained, center pin 52 has a construction that is modified from that of a typical center pin, in order to accommodate the components of separator assembly 10. Bushing 58 supports center pin 52, and thereby the outer end of feed screw 26. In a manner to be explained, bushing 58 also functions to support certain components of the separator assembly 10 relative to orifice plate 32. The center pin 52 is non-rotatably secured to feed screw 26, such as by means of recessed keyways (not shown) on center pin 52 that correspond to keys (not shown) on the hub of knife holder 28, although it is understood that any other satisfactory engagement structure may be employed for ensuring that center pin 52 rotates with feed screw 26. Accordingly, rotation of feed screw 26 functions to rotate both center pin 52 and knife assembly 60, consisting of knife holder 28 and the knife inserts supported by the arms 30*a*-30*f* of knife holder 28. Bushing 58 and orifice plate 32 remain stationary, and rotatably support the end of center pin 52.

As understood in the art, the head 18 is generally tubular and thus includes an axial bore 68 in which feed screw 26 is rotatably mounted. Bore 68 is typically provided with flutes 70 for controlling the flow of material through head 18, i.e. for preventing material from simply rotating with feed screw and for providing a downstream flow path to prevent backpressure from pushing material back into hopper 14. Also as is known, the dimension of flutes 70 may vary along the flute length to produce different effects. Head 18 may have an increased diameter at its downstream end. Flutes 70 may be primarily located adjacent or along this increased diameter area. Flutes 70 may be dimensioned to move material more efficiently across the transition area between the main body of head 18 and the increased diameter area of head 18.

Referring to FIG. 6, the orifice plate 32 has an outer section 72 that includes a large number of relatively small grinding openings 74, and an inner section 76 that includes a series of radially spaced collection passages 78. The size of grinding openings 74 varies according to the type of material being ground and the desired end characteristics of the ground material. In accordance with known grinding principles, material within head 18 is forced toward orifice plate 32 by rotation of feed screw 26 and through openings 74, with the knife inserts of rotating knife assembly 60 acting to sever the material against the inner grinding surface of orifice plate 32 prior to the material passing through openings 74.

In some instances, pieces of hard material, such as bone or gristle, which may be too large to pass through grinding openings 74, will be present along with the soft, useable material. These pieces, which are not cut by the action of the knife inserts against plate 32, are pushed toward inner section 76 of plate 32 by the rotating action of knife assembly 60, where the pieces of hard material can be removed from the primary ground material stream through collection passages 78. Collection passages 78 are large relative to grinding openings 74, and may be generally triangular, though it is understood that collection passages 78 may have any configuration as desired. Each of collection passages 78 may be provided with a ramped entryway 80 opening onto the surface of orifice plate 32. Ramped entryways 80 may be provided on both sides of plate 32, which may be double sided so as to extend the lifetime of use of plate 32.

Inevitably, the hard material that passes through collection passages 78 carries with it a certain amount of usable soft material. This mixture of soft and hard material passes through collection passages 78 of orifice plate 32 to the separator assembly 10, where it can be subjected to a secondary grinding and/or separation process to maximize ground material output. While it is advantageous to have separated as much usable soft material as possible from the hard material before it passes through the orifice plate 32, nevertheless, in most instances, good, usable soft material is carried with the hard material through the collection passages 78. In the past, conventional grinding machines have simply collected the hard material together with the soft material and treated them both as waste. The separator assembly 10 of the present invention, however, is designed to separate the usable soft material from the hard material that passes through the collection passages 78 of the orifice plate 32, deliver the soft material to an appropriate outlet, and pass the hard material to a discharge or collection arrangement.

Referring to FIGS. 2 and 5, the separator assembly 10 includes a separator auger or screw 62 that is secured to, and rotates with, the center pin 52. The separator assembly 10 also includes a separator chamber or tube 64 that defines a separator passage 66 that communicates with a collection tube or receptacle. Separator screw 62 is driven by feed screw 26, and extends through the passage of separator chamber 64 and into and through discharge passage 66. In addition, the separator assembly 10 includes a support 84, which serves to support the outer ends of separator screw 62 and separator chamber 64.

In the illustrated embodiment, the support 84 is in the form of a generally reverse C-shaped member including a pair of legs 86 that are connected together by an outer bridge section 88. The inner ends of legs 86 are adapted to be secured to the structure of grinding head 18, such as to the outwardly facing annular surface defined by mounting ring 20. Representatively, the inner ends of legs 86 may be secured to mounting ring 20 by welding, although it is understood that any other satisfactory arrangement may be employed. Support 84 provides an open configuration downstream of orifice plate 32, in that support 84 does not obstruct the discharge of material from the downstream surface of orifice plate 32. In addition, while support 84 is shown as a reverse C-shaped member, it is understood that support 84 may have any other satisfactory configuration.

At the center of bridge section 88, support 84 includes a support area shown generally at 90. Support area 90 functions to engage and support the outer end of separator chamber 64. In the illustrated embodiment, the support area 90 includes an annular lip 92 which defines a recess that faces orifice plate 32. The end of separator chamber 64 has a reduced diameter area 94 defining a shoulder that is received within the recess defined by the lip 92, which functions to securely engage and retain separator chamber 64 between support area 90 and orifice plate 32. With this arrangement, separator chamber 64 is engaged to between orifice plate 32 and support area 90 in a manner that prevents axial movement of separator chamber 64. Alternatively, the separator chamber 64 may be attached using a threaded arrangement.

The separator chamber 64 of separator assembly 10 is in the form of a generally elongated and tubular body that tapers or narrows from an intake end 96 at the downstream surface of orifice plate 32 to a discharge end 98 that interfaces with the support area 90 of support 84 as noted above. The separator passage 66 of separator chamber 64 is configured to allow the separator screw 62 to be passed through the separator chamber 64 and coupled to the feed screw 26, so that the separator screw 62 rotates with the feed screw 26. It is understood, however, that the separator screw 62 could be directly coupled to the feed screw 26 or coupled using a suitable coupler.

In the illustrated embodiment as best shown in FIGS. 2 and 5, the separator chamber 64 has a two-piece construction. It is understood, however, that the separator chamber 64 may also have a one-piece construction or maybe formed of any other number of components. As shown, the intake end 96 of separator chamber 64 has a generally conical shaped inlet that defines a frustoconical inlet volume 82, which alternatively may be a series of individual inlet passages. The diameter of the intake end 84 is slightly greater than that of the inner section 76 of the orifice plate 32 so that the hard material that is passed through hard material collection passages 78 of the orifice plate 32 is received by the frustoconical inlet volume 82 of separator assembly 10.

The intake end 96 of separator chamber 64, in some embodiments, may be formed with spiral flutes 83. Similarly, the discharge end 98 of separator chamber 64, in some embodiments, may be provided with spiral flutes 85. The spiral flutes 83 cooperate with separator screw 62 to provide positive engagement and downstream advancement of the material as it passes through inlet volume 82 at the upstream end of separator chamber 64. Likewise, the spiral flutes 85 at the downstream end of separator chamber passage 66 provide positive engagement and downstream advancement of the material as it is discharged from separator chamber 66.

The separator screw 62 includes helical pressure flights 87 that extend along its length. The diameter of the helical pressure flights 87 decreases from the intake end 96 to the discharge end 98. In this regard, the diameters of the pressure flights 87 decrease along the length of the separator screw 62 to match the taper of the passage 66 defined by the wall of the separator chamber 64, shown at 97. A series of discharge perforations or openings 99 are formed in the wall 97 of the separator chamber 64. The discharge openings 99 are formed in a perforation or hole zone of the separator chamber 64 located between the intake end 96 and the discharge end 98, and are designed to pass soft material from the passage 66 of the separator chamber 64 to the exterior of the separator chamber 64. The openings 99 are located between the spiral flutes 83 at the intake and 96 and the spiral flutes 85 at the discharge and 98 of separator chamber 64. The separator chamber wall 97 defines a smooth inner surface within the perforation or whole zone of the separator chamber 64.

The pressure flights 87 serve two primary functions. First, the flights 87 advance the mixture of soft and hard material from the collection passages 78 toward the discharge end 98 through the passage 66 of the separator chamber 64. Second, the flights 87 force the mixture of soft and hard material against the inner surface of the wall 97 of the separator chamber 64. As the separator screw 62 is rotated, flow of the mixture of soft and hard material through the passage 66 is restricted by the tapered inner surface of the wall 97. This restriction functions to separate the soft material from the hard material, and the pressure within the passage 66 of the separator chamber 64 functions to force the separated soft material through the discharge openings 99 in the wall 97. Moreover, since the separator chamber 64 is tapered, a shearing force applied to the mixture of soft and hard material by rotation of separator screw 62 remains relatively constant as it travels along the length of the separator chamber passage 66. As a result, a continuous shearing force is applied to the hard material even as it is reduced in size as it is forced through passage 66.

At the discharge and of the separator chamber 64, the passage 66 defined by the separator chamber 64 communicates with an outlet passage 100 that extends through support area 90 of support 84. In the illustrated embodiment, the outlet passage 100 is in the form of a constant diameter passage that extends from the downstream end of support area 90 to the upstream end, with the downstream end having a diameter that corresponds to the diameter of separator chamber passage 66 at discharge and 98. It is understood, however, that outlet passage 100 may flare outwardly in an upstream-to-downstream direction so as to relieve pressure when the hard material is discharged from separator chamber passage 66, to effectively release the hard material so that it can be propelled through outlet passage 100 to a collection arrangement, which may be a receptacle or a discharge conduit in a manner as is known.

Referring to FIGS. 2 and 5, centering pin 52 generally includes an inner section 102 that is configured to be received within the bore 54 in the end of feed screw 26. In addition, centering pin 52 includes a knife mounting section 104 that is engaged within passage 56 in the hub section of knife holder 28, and a bushing engagement section 106 that is received within the passage of bushing 58, to rotatably support the centering and 52 relative to orifice plate 32. In addition, the centering pin 52 includes a separator screw mounting section 108 adjacent bushing engagement section 106, and an extension section 110 that extends outwardly from separator screw mounting section 108. A transverse passage 112 extends through separator screw mounting section 108.

Separator screw 62 has a generally hollow construction, defining an axial passage 114 extending throughout its length. At the inner or downstream end of separator screw 62, passage 114 has a slightly enlarged diameter relative to the remainder of the length of the passage 114, so as to define a recess 116 that extends into the inner end of separator screw 62. At its outer or downstream end, passage 112 is formed with a series of internal threads 118. In assembly, separator screw 62 is engaged with centering pin 52 such that extension section 110 of centering pin 52 is received within axial passage 114 of separator screw 62. When separator screw 62 is fully engaged with centering pin 52, separator screw mounting section 108 of centering pin 52 is received within recess 116 in the inner or downstream end of separator screw 62. As shown in FIG. 5, there are close tolerances between the outside surfaces of separator screw mounting section 108 and extension section 110 and the respective facing surfaces of recess 116 and axial passage 114, so that separator screw 62 is centered on the longitudinal axis of centering pin 52.

Referring to FIGS. 3 and 4, the inner end of separator screw and 62 may be formed with a pair of transversely aligned slots 120, which extend in a downstream direction from the inner or upstream end of separator screw 62. To non-rotatably mount the separator screw 62 to centering pin 52, a drive pin 122 may extend through transverse passage 112 in the separator screw mounting section 108 such that its ends are positioned within slots 120. In this manner, separator screw 62 is mounted to drive pin 52 in a manner that ensures separator screw 62 rotates with centering pin 52, while enabling axial movement of separator screw 62 relative to drive pin 52 by movement of slots 120 relative to drive pin 122.

Figure 8:
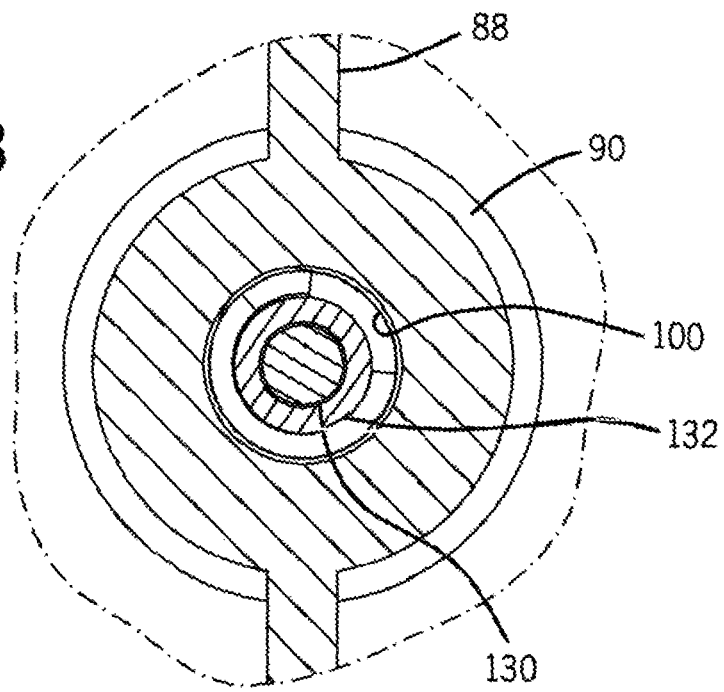
FIG. 8 is a partial section view taken along line 8-8 of FIG. 5.

An adjustment arrangement 124 is engaged with the downstream end of separator screw 62 in order to enable adjustment in the axial position of separator screw 62 within passage 66 defined by separator chamber 64. In this manner, the clearance between separator screw pressure flights 87 and the inner surface of separator chamber wall 97 can be adjusted to accommodate different material characteristics. Adjustment arrangement 124 includes a threaded adjustment member 126, which may generally be in the form of a bolt having a head 128 and a shank 130 that is threaded throughout its length, in combination with a spacer or sleeve 132 and a locking member 134, which may be in the form of a lock nut that is engageable with the threads of adjustment member 126. As shown in FIGS. 5 and 8, sleeve 132 and shank 130 of adjustment member 126 extend through passage 100 in support area and 90 defined by support 84, so that the outer end of sleeve 132, locking member 134 and head 128 of adjustment member 126 are located outwardly of the downstream end of support area 90. With this construction, sleeve 132 cooperates with passage 100 to form an annular discharge passage that is in communication with the downstream end of separator chamber passage 66 and extends through support area 90, so as to enable hard material discharged from the downstream end of separator chamber passage 66 to flow through support area 90 for collection or discharge.

Locking member 134 is engaged with the threads of adjustment member shank 130 and is located toward head 128. Shank 130 of adjustment member 126 extends through sleeve 132 and is engaged with internal threads 118 at the downstream end of axial passage 114 in separator screw 62. In operation, the end of adjustment member shank 130 is engaged with the facing end of extension section 110 of centering pin 52, and the inner end of sleeve 132 is engaged with the downstream end of separator screw 62. Locking member 134 is rotatably advanced into engagement with the outer or downstream end of sleeve 132, which thus prevents rotation of adjustment member 126 and locks the axial position of separator screw 62. When it is desired to change the axial position of separator screw 62 so as to adjust the spacing between pressure flights 87 and the inner surface of separator chamber wall 97, locking member 134 is moved toward head 128 so as to enable adjustment member 126 to be rotated. The user then rotates adjustment member 126 using head 128, and engagement between separator screw threads 118 and the threads of shank 130 function to change the axial position of separator screw 62. Relative axial movement between separator screw 62 and drive pin 52 is accommodated by slots 120 in the inner end of separator screw 62. Once the desired axial position of separator screw 62 is attained, sleeve 132 is advanced inwardly so that its inner end is engaged with the end of separator screw 62, and locking member 134 is again advanced into engagement with the outer end of sleeve 132 so as to secure the axial position of separator screw 62.

Figure 9:
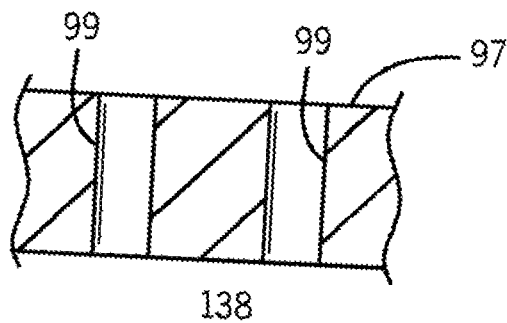
FIG. 9 is a partial enlarged section view with reference to line 9-9 of FIG. 5, showing a first embodiment of perforations in the wall of a separator chamber incorporated in the separator-type recovery system of FIG. 1.
Figure 10:
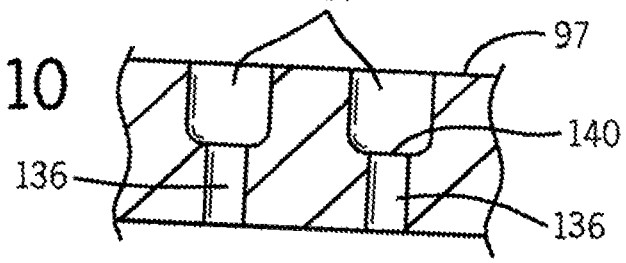
FIG. 10 is a view similar to FIG. 9, showing an alternate embodiment for the perforations in the wall of the separator chamber.
Figure 11:
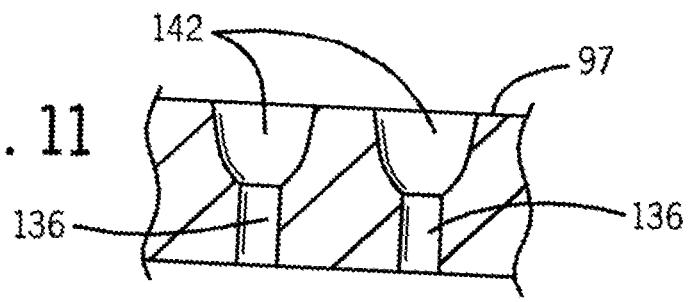
FIG. 11 is a view similar to FIGS. 9 and 10 showing another embodiment for the perforations in the wall of the separator chamber.

FIG. 9 is an enlarged view of the wall 97 of separator chamber 64, showing the discharge perforations or openings 99 that extend through the wall 97 so as to establish communication between separator chamber passage 66 and the exterior of separator chamber 64. The openings 99 as shown in FIG. 9 have a constant diameter throughout the length of each opening 99. In an alternative construction as shown in FIG. 10, the openings in the separator chamber wall 97 may be formed so as to have a reduced dimension inlet portion 136 and an expanded dimension outer portion 138. The expanded dimension outer portion 138 may be formed with a transverse inner surface shown at 140, which provides a relatively sudden transition between inlet portion 136 and outer portion 138. In an alternative embodiment as shown in FIG. 11, an expanded dimension outer portion 142 may be formed with flared side walls which provide a more gradual transition between inlet portion 136 and the exterior surface of wall 97. In both alternative embodiments, the expanded dimension outer portion provides pressure relief so as to facilitate the passage of material from passage 66 in separator chamber 64 through the openings or perforations in separator chamber wall 97 to the exterior of separator chamber 64.

Figure 12:
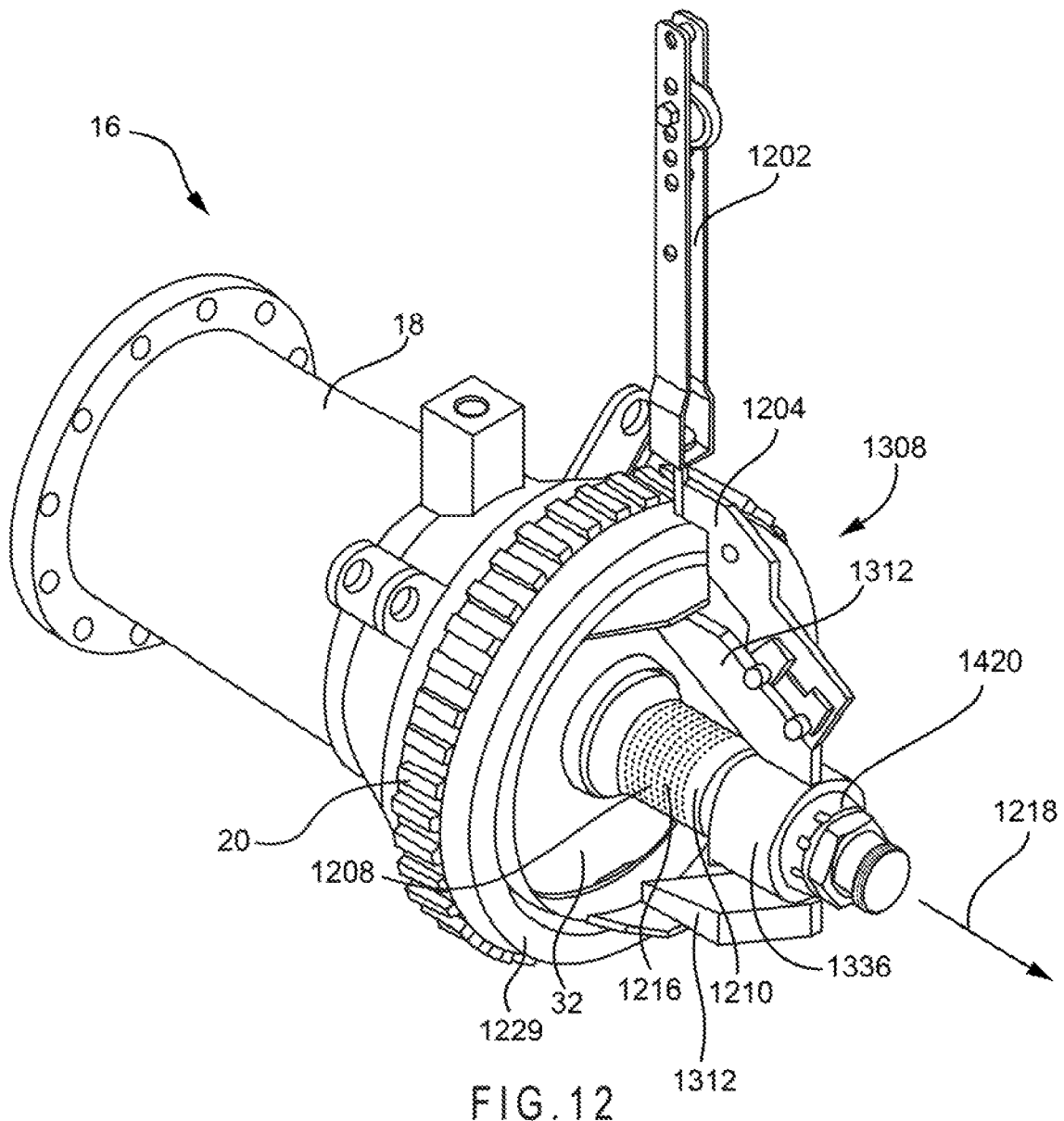
FIG. 12 is a perspective view of an alternate embodiment of a grinding arrangement.

FIGS. 12-17 disclose an alternate embodiment of the grinding arrangement 16. Referring to FIGS. 12, 13A, and 13B, FIG. 12 shows the grinder head 18 and mounting ring 20, which may be similar to or the same as the components shown in the embodiment of FIGS. 2 and 5. The mounting ring 20 may be supported by a ring lifter trolley 1202, which supports a front-end of the grinding arrangement 16 at an attachment point 1204. Rather than the tapered separator chamber 64 of FIG. 2, this embodiment may include a cylindrical separator chamber 1208 or tubular structure having a cylindrical (parallel) sidewall 1210 that defines a constant diameter separator passage 1304. The sidewall 1210 may include a plurality of sidewall apertures 1216. The direction of product flow (a downsteam direction) is shown generally as 1218.

Figure 13A:
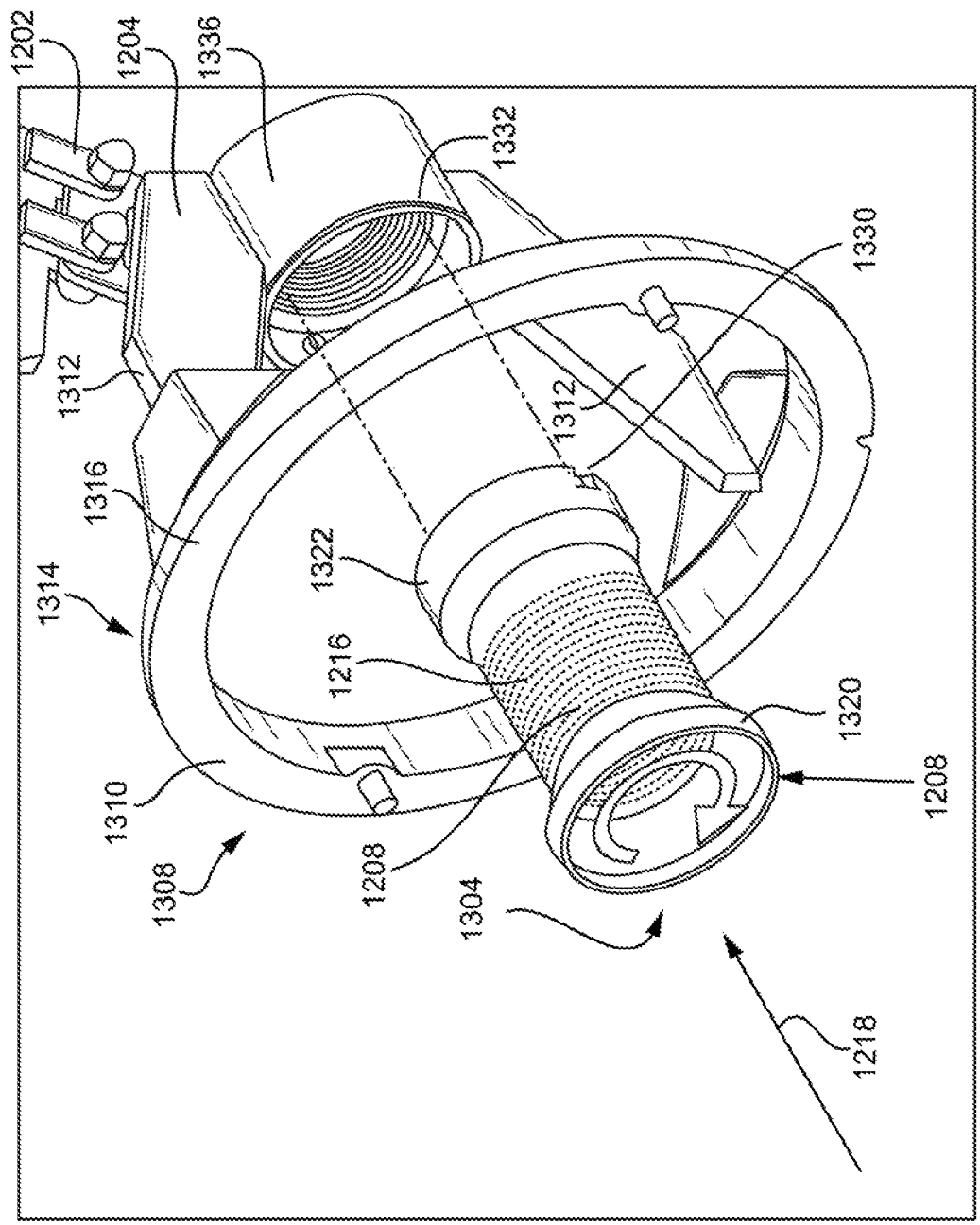

FIGS. 13A and 13B show the mounting ring 20 further coupled to a support bridge 1308, which includes a circular bridge ring 1310 and two or more support bridge ribs 1312. Only a small cut-away portion of a support bridge rib 1312 is shown in FIG. 12 for purposes of clarity. The support bridge 1308 performs a similar support function as the bridge section 88 and support 84 shown in the embodiment of FIG. 2. The support bridge ribs 1312 may couple a bridge collar 1336 to the circular bridge ring 1310. The circular bridge ring 1310 may have threads 1314 and a shoulder 1316, which operatively couple the bridge ring 1310 with corresponding threads 1224 on the mounting ring 20. Alternatively, the shoulder may be formed in mounting ring 20.

The cylindrical separator chamber 1208 includes a flared input flange 1320 and a flared output flange 1322, and both may be integrally formed with the cylindrical separator chamber 1208. The flared input flange 1320 operatively mates with the bushing 58 so as to receive the food-product material via the collection passages 78 (and through corresponding apertures in the bushing 58) in the orifice plate 32 (FIG. 5).

Figure 14:
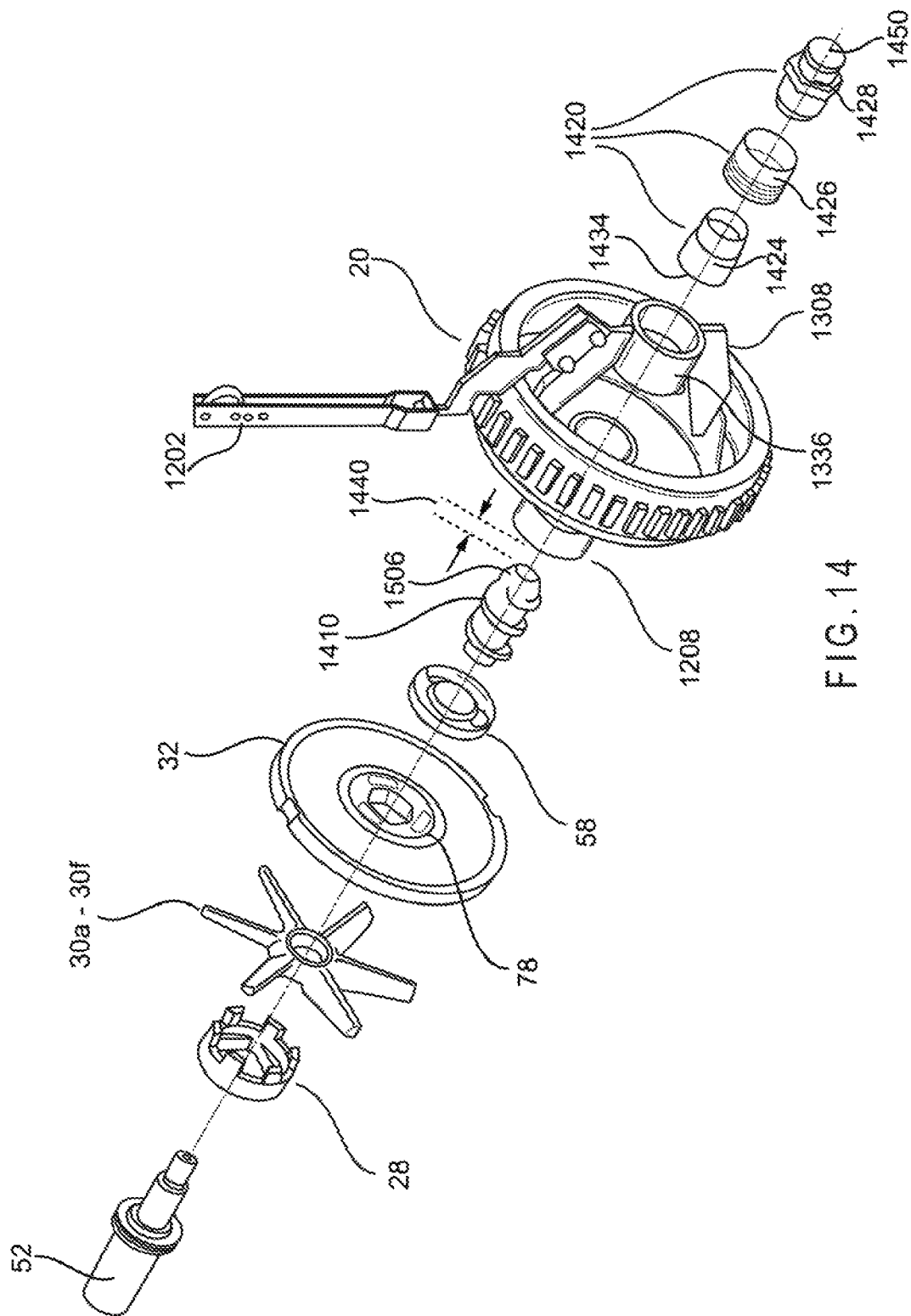
FIG. 14 is an exploded view of the grinding arrangement of FIG. 12.
Figure 15:
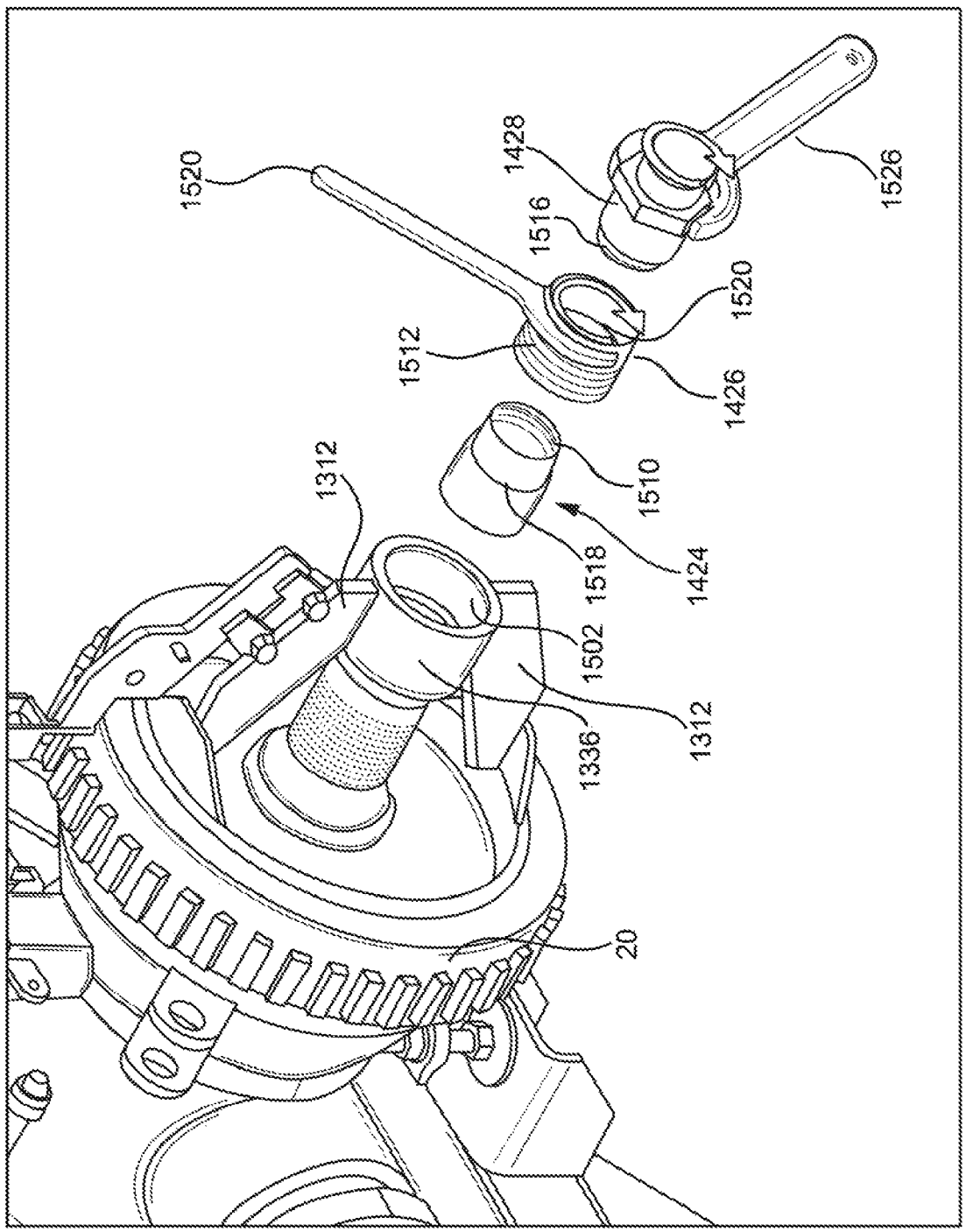
FIG. 15 is an exploded view of the ring valve assembly of FIG. 12.
Figure 16G:
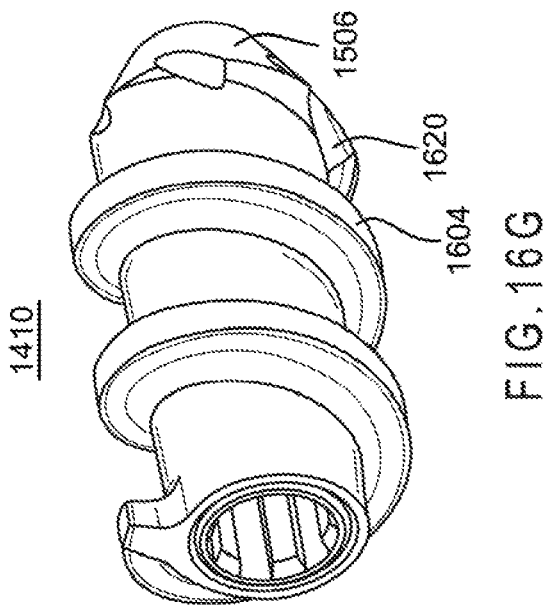
Figure 16F:
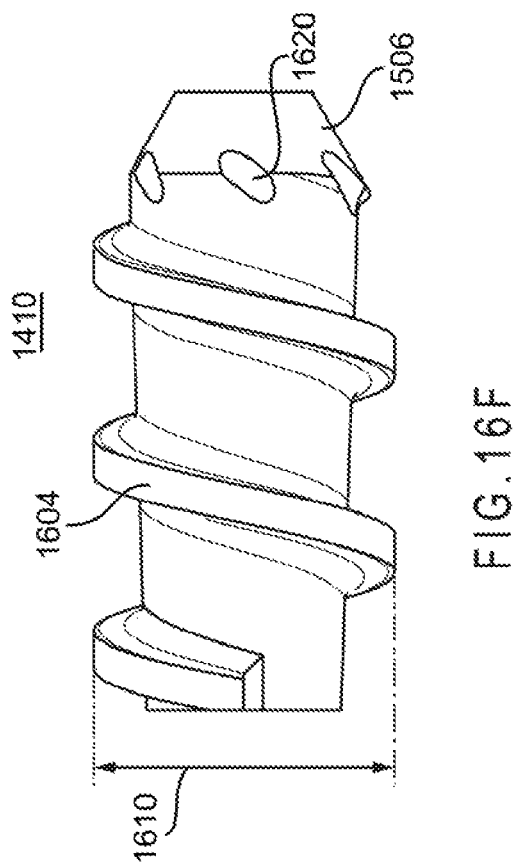
Figure 16H:
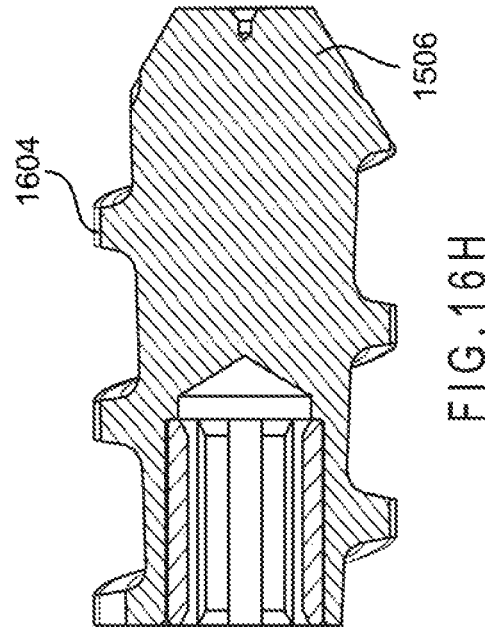

FIGS. 14 and 15 illustrate some of the same components as shown in FIGS. 2, 5, and 6, such as the center pin 52, the knife holder 28, the blades 30a-30f, the orifice plate 32, and the bushing 58. Moreover, the embodiments of FIGS. 12-17 discloses differences from the embodiments of FIGS. 2, 5, and 6, such as a constant diameter separator screw 1410 and the cylindrical separator chamber 1208. Also included in this embodiment is a ring valve assembly 1420 having a ring valve 1424, a ring valve carrier 1426, and a ring lock 1428. The ring valve assembly 1420 provides an adjustment to control an amount, and in some embodiments, the size, of the hard material processed through the separation chamber 1208, as described below.

The ring valve 1424 has an internal conical portion 1434 (best seen in FIG. 17C) in communication with the nose portion 1506 of the separator screw 1410, where the ring valve 1424 is in axial alignment with the separator screw 1410. The ring valve carrier 1426 is configured to reciprocally displace the ring valve 1424 in an axial direction relative to the separator screw 1410 so as to vary a gap 1440 between the nose portion 1506 of the separator screw 1410 and the internal conical portion 1434 of the ring valve 1424. The size of the gap 1440 determines an amount, and in some embodiments, a size of the hard material (along with some soft material) that may be passed toward a discharge outlet 1450. In particular, the gap 1440 in the axial direction directly determines the amount of space between the inside diameter of the ring valve 1423 and the nose 1506 separator screw 1410, and thus determines an amount, and in some embodiments, the size of hard matter, that can pass therethrough. The discharge outlet 1450 may be a pipe 1802 (see FIG. 18) or other conduit operatively coupled to an end of the ring lock 1428. The discharge outlet leads to a waste container (not shown).

As shown in FIGS. 13A and 131, the flared output flange 1332 includes one or more slots 1330 that communicate with corresponding pins 1332 in the fixed support collar 1336. Further, the ring valve 1424 may be reciprocally and axially displaced relative to the fixed bridge support collar 1336. The ring valve 1424, the ring valve carrier 1426, and the ring lock 1428 of the ring valve assembly 1420 are configured to adjust the axial displacement of the ring valve 1424 relative to the support collar 1336. This, in turn, adjusts the distance or gap 1440 between the nose portion 1506 of the separator screw 1410 and the internal conical portion 1434 of the ring valve 1424. Note that the separator screw 1410 may be driven by rotation of the center pin 52 (FIG. 14) as in the embodiments of FIGS. 2, 5, and 6, and may be coupled to the center pin 52 using a spline fitting (see FIG. 16G) or other known interlocking configuration.

As best shown in FIG. 15, the support collar 1336 includes a threaded portion 1502. Further, the ring valve 1424 includes a threaded portion 1510, the ring valve carrier 1426 includes a threaded portion 1512, and the ring lock 1428 also includes a threaded portion 1516. To adjust the gap 1440, the threaded portion 1512 of the ring valve carrier 1426, when rotated cooperates with the internal threaded portion 1502 of the support collar 1336 to axially displace the ring valve 1424 within the ring valve carrier 1426. When the ring valve carrier 1426 is tightened against the support collar 1336, a shoulder 1518 of the ring valve 1424 is urged against a corresponding shoulder 1520 of the ring valve carrier 1426 so as to urge the ring valve 1424 toward the separation chamber 1208. Accordingly, rotation of the ring valve carrier 1426 in the axially direction may displace the ring valve 1424 within the collar 1336. Once the desired gap is achieved, the ring lock 1428 is tightened using a wrench 1526 or other suitable tool to prevent further rotation of the ring valve carrier 1426.

FIGS. 16A-16H show the separator screw 1410 in greater detail. The separator screw 1410 is disposed within the separator passage 1304 of the separator chamber 1208, and includes a thread 1604, also referred to as a non-tapering helical pressure flight. The separator screw 1410 is defined by constant major diameter 1610 and a constant minor diameter 1612 along its body portion 1616. However, in some embodiments, the separator screw 1410 may have a variable minor diameter 1612. Rotation of the separator screw 1410 within the separator chamber 1208 causes separation of soft material from the mixture of soft material and hard material, and forces most of the soft material through the apertures 1216 in the sidewall 1210 of the separator chamber 1208, and advances the hard material that does not fit through the apertures 1216 in the downstream direction 1218 toward the discharge outlet 1450.

The nose portion 1506 may include a plurality of angled ports or grooves 1620. Preferably, the separator screw 1410 includes six grooves 1620, however any suitable number of grooves 1620 may be included. Hard matter that is transported toward the nose 1506 of the separator screw 1410 within the separator chamber 1208 is partially crushed and advanced forwardly as the nose portion 1506 rotates proximate to the internal conical portion 1434 of the ring valve 1424. The grooves 1620 in the nose portion 1506 and scalloped depressions 1710 in the valve ring 1424 assist in grinding down and reducing in size hard material that may be too large to pass through the discharge end 1450. Note that approximately 99.8% of the soft material is collected through the apertures 1215 with only about 0.2% of the soft material inadvertently exiting toward the discharge end 1450 as waste along with the hard material. This percentage may vary slightly depending on the size of the gap 1440.

Figure 17A:
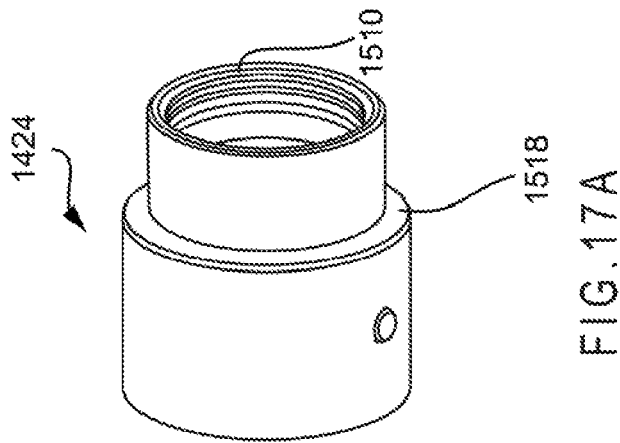
FIGS. 17A-17D show various views of the ring valve of FIG. 12.
Figure 17B:
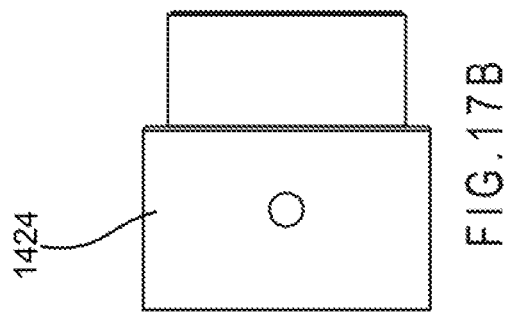
Figure 17D:
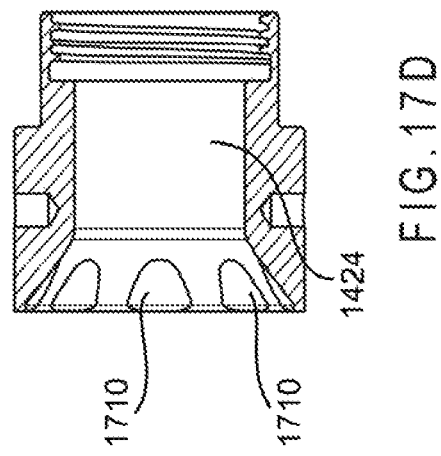
Figure 17C:
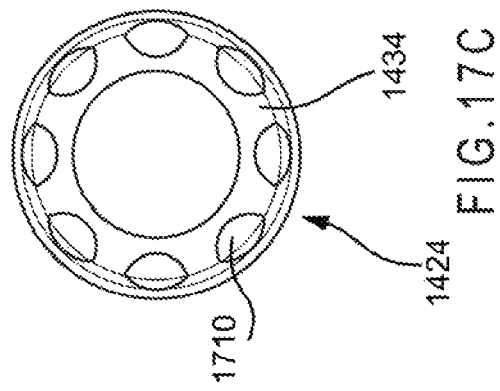

FIGS. 17A-17D show the ring valve 1424 in greater detail. FIG. 17C particularly shows the internal conical portion 1434 of the ring valve 1424, which preferably includes the eight equidistantly spaced scalloped depressions 1710. However, any suitable number of scalloped depressions may be used. The scallop depressions 1710, in conjunction with the nose 1506 of the separator screw 1410 and associated grooves 1620, may regulate the amount or size of hard material passed out through a passageway formed in the ring valve 1424, the ring valve carrier 1426, and the ring lock 1428.

The ring valve assembly 1420 provides a quick, easy, and accurate mechanism for manually adjusting the grinder 16 parameters, typically relating to a particular batch of food-product to process. Once set for a particular desired type of food processing, the amount of rejected material, and hence overall yield, is relatively fixed and constant.

FIG. 18A is an exploded assembly view of pertinent components of the grinding arrangement 16 of FIGS. 12-17, while FIGS. 18B and 18C are side and end views, respectively of the grinding arrangement of FIG. 18A.

It should be understood that the invention and its various embodiments are not limited in its application to the details of construction and arrangements of the components set forth herein. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A ring adjustment assembly for a grinding machine having a grinding housing, the ring adjustment assembly, comprising:
    a cylindrical separator chamber in communication with the grinding housing;
    the cylindrical separator chamber having a sidewall that defines a separator passage having a constant diameter along its length, the sidewall including a plurality of apertures;
    the separator chamber having an inlet end located at an upstream end of the separator passage, and an outlet end located at a downstream end of the separator passage, the inlet end aid outlet end integrally formed with the separator chamber, the inlet end configured to receive a mixture of soft material and hard material from an upstream portion of the grinding housing;
    the inlet end having a taper that decreases in diameter in the downstream direction until meeting the upstream end of the separator passage;
    the outlet end having taper that increases in diameter in the downstream direction starting at the downstream end of the separator passage;
    a separator screw disposed within the separator passage of the separator chamber, the separator screw having a body portion and a nose portion;
    a ring valve having an internal conical portion in communication with the nose portion of the separator screw, the ring valve in axial alignment with the separator screw;
    a ring valve carrier configured to reciprocally displace the ring valve in an axial direction relative to the separator screw so as to vary a gap between the nose portion of the separator screw and the internal conical portion of the ring valve; and
    wherein the size of the gap determines an amount of the hard material that is passed toward a discharge outlet of the ring adjustment assembly.

2. The ring adjustment assembly of claim 1, wherein the separator screw has a major diameter and a minor diameter along the body portion.

3. The ring adjustment assembly of claim 1, wherein rotation of the separator screw within the separator passage of the separator chamber causes separation of the soft material from the mixture of the soft material and the hard material, and forces the soft material through the apertures in the sidewall of the separator chamber.

4. The ring adjustment assembly of claim 1, wherein rotation of the separator screw within the separator passage of the separator chamber advances the hard material in the mixture of the soft material and the hard material, in a downstream direction toward the discharge outlet.

5. The ring adjustment assembly of claim 1, wherein the separator screw includes helical pressure flights that extend along a portion of the body portion.

6. The ring adjustment assembly of claim 5, wherein a diameter of the helical pressure flights is constant in a direction from the inlet end of the separator chamber toward the nose portion.

7. The ring adjustment assembly of claim 1, wherein the nose portion of the separator screw includes a plurality of angled ports that facilitate grinding down or reducing in size, the hard material that is advanced in a downstream direction within the separator passage by the rotation of the separator screw.

8. The ring adjustment assembly of claim 1, wherein the inlet end of the separator chamber is flared.

9. The ring adjustment assembly of claim 1, wherein the outlet end of the separator chamber is flared and is configured to operatively couple to the ring valve.

10. A ring adjustment assembly for a grinding machine having a grinding housing defining an opening, the ring adjustment assembly comprising:
    a separator assembly in communication with the grinding housing, including:
        a cylindrical separator chamber having a tapered inlet end located at an upstream end of the separator chamber, a tapered outlet end located at a downstream end of the separator chamber, the inlet end and the outlet end integrally formed with the separator chamber, and a sidewall that defines a constant diameter separator passage between the inlet end and the outlet end;
        wherein the inlet end taper decreases in diameter n the downstream direction until meeting an upstream end of the separator passage, and wherein the outlet end taper increases in diameter in the downstream direction starting at a downstream end of the separator passage;
        the inlet end configured to receive a mixture of soft material and hard material from an upstream portion of the grinding housing;
        a separator screw disposed within the separator passage of the separator chamber, the separator screw having a body portion and a nose portion;
    a ring valve having an internal conical portion in communication with the nose portion of the separator screw, the ring valve in axial alignment with the separator screw;
    a ring valve carrier configured to reciprocally displace the ring valve in an axial direction relative to the separator screw so as to vary a gap between the nose portion of the separator screw and the internal conical portion of the ring valve; and
    wherein the size of the gap determines an amount of the hard material that is passed toward a discharge outlet of the ring adjustment assembly.

11. The ring adjustment assembly of claim 10, wherein the separator screw has a major diameter and a minor diameter along the body portion.

12. The ring adjustment assembly of claim 10, wherein the separator screw includes helical pressure flights that extend along a portion of the body portion.

13. The ring adjustment assembly of claim 12, wherein a diameter of the helical pressure flights is constant in a direction from the inlet end of the separator chamber toward the nose portion.

14. The ring adjustment assembly of claim 10, wherein the nose portion of the separator screw includes a plurality of angled ports that facilitate grinding down or reducing in size, the hard material that is advanced in the downstream direction within the separator passage by the rotation of the separator screw.

15. A ring adjustment assembly for a grinding machine having a grinding housing defining an opening, the grinding machine further comprising:
   a rotatable food-product auger contained within the grinding housing;
   an orifice plate located within the opening of the grinding housing, wherein the orifice plate defines an upstream surface and a downstream surface, and includes a plurality of outer grinding openings extending between the upstream surface and the downstream surface for discharging soft material through the orifice plate upon rotation of the rotatable food-product auger, and one or more collection passages extending between the upstream surface and the downstream surface for discharging a mixture of soft material and hard material through the orifice plate upon rotation of the rotatable food-product auger;
   a separator assembly located downstream of the orifice plate, wherein the separator assembly includes:
      an upstream inlet configured to receive material from the one or more collection passages;
      a cylindrical separator chamber having a tapered inlet end located at an upstream end of the separator chamber, a tapered outlet end located at a downstream end of the separator chamber, the inlet end and outlet end integrally formed with the separator chamber;
      the separator chamber having a sidewall that defines a constant diameter separator passage between the inlet end and the outlet end, the sidewall including a plurality of apertures, the separator passage configured to receive a mixture of soft material and hard material from the upstream inlet; and
      a separator screw disposed within the separator passage of the separator chamber, the separator screw having a major diameter and a minor diameter along a body portion thereof, wherein the separator screw is interconnected with the rotatable food-product auger and is rotatable within the separator passage in response to rotation of the rotatable food-product auger, wherein rotation of the separator screw causes separation of soft material from the mixture of soft material and hard material, and forces the soft material through the apertures in the sidewall of the separator chamber, and advances the hard material in a downstream direction toward a discharge outlet;
   the ring adjustment assembly comprising:
      a ring valve having an internal conical portion in communication with a nose portion of the separator screw, the ring valve in axial alignment with the separator screw;
      a ring valve carrier configured to reciprocally displace the ring valve in an axial direction relative to the separator screw so as to vary a gap between the nose portion of the separator screw and the internal conical portion of the ring valve; and
      wherein the size of the gap determines an amount of the hard material that is passed toward the discharge outlet.

16. The grinding machine of claim 15, wherein the separator screw includes helical pressure flights that extend along a portion of the body portion.

17. The grinding machine of claim 16, wherein a diameter of the helical pressure flights is constant in a direction from the inlet end of the separator chamber toward the nose portion.

18. The grinding machine of claim 15, wherein the nose portion of the separator screw includes a plurality of angled ports that facilitate grinding down or reducing in size, the hard material that is advanced in the downstream direction within the separator passage by the rotation of the separator screw.

19. The ring adjustment assembly of claim 15, wherein the input end of the separator chamber is flared.

20. The ring adjustment assembly of claim 15, wherein the output end of the separator chamber is flared and is configured to operatively couple to the ring valve.

* * * * *